United States Patent [19]
Scherl et al.

[11] Patent Number: 4,504,972
[45] Date of Patent: Mar. 12, 1985

[54] METHOD AND APPARATUS FOR AUTOMATIC RECOGNITION OF IMAGE AND TEXT OR GRAPHICS AREAS ON PRINTED MASTERS

[75] Inventors: Wolfgang Scherl, Munich; Ludwig Abele, Proecking, both of Fed. Rep. of Germany; Friedrich M. Wahl, San Jose, Calif.; Hermann Fuchsberger, Munich, Fed. Rep. of Germany

[73] Assignee: Siemens Aktiengesellschaft, Berlin & Munich, Fed. Rep. of Germany

[21] Appl. No.: 342,898

[22] Filed: Jan. 26, 1982

[30] Foreign Application Priority Data

Feb. 27, 1981 [DE] Fed. Rep. of Germany ....... 3107521

[51] Int. Cl.³ ............................................. G06K 9/36
[52] U.S. Cl. ..................................... 382/51; 358/282; 382/9
[58] Field of Search ................ 382/18, 51, 9; 358/282

[56] References Cited

U.S. PATENT DOCUMENTS

| | | | |
|---|---|---|---|
| 3,805,237 | 4/1974 | Cobb et al. | 382/9 |
| 3,805,239 | 4/1974 | Watanabe | 382/51 |
| 3,845,466 | 10/1974 | Hong | 382/18 |
| 3,935,562 | 1/1976 | Stephens | 382/18 |
| 4,208,652 | 6/1980 | Marshall | 382/18 |
| 4,251,799 | 2/1981 | Jih | 382/18 |
| 4,323,880 | 4/1982 | Lucas | 382/18 |
| 4,377,803 | 3/1983 | Lotspiech et al. | 382/18 |
| 4,411,015 | 10/1983 | Scherl et al. | 358/282 |

OTHER PUBLICATIONS

Bishop et al., "Char. Rec. Approach Involving Histogram Class.", *IBM Tech. Disclosure Bulletin*, vol. 21, No. 9, Feb. 1979, pp. 3461-3467.

*Primary Examiner*—Leo H. Boudreau
*Attorney, Agent, or Firm*—Hill, Van Santen, Steadman & Simpson

[57] ABSTRACT

A method and apparatus for automatically recognizing the presence of an image area and a text or graphics area on a printed master which is being examined for determination of the textual content thereof employ an optoelectronic video scanner, the scanned values obtained therefrom being digitized and stored in a memory. The input master is schematically divided into small overlapping windows and a number of length of run histograms are generated by a computer for each such window. The particular characteristics of each of the histograms are examined for determination as to whether the histograms correspond to a text or graphics area or an image area of printed material on the master.

8 Claims, 5 Drawing Figures

METHOD AND APPARATUS FOR AUTOMATIC RECOGNITION OF IMAGE AND TEXT OR GRAPHICS AREAS ON PRINTED MASTERS

BACKGROUND OF THE INVENTION

The present invention relates to a method and apparatus for automatically recognizing the presence of image and text areas or graphics areas on a printed master.

Documents produced in a typical office are frequently modified in some form and subsequently stored. In order to undertake these tasks in an economical manner, automatic text processing units, or word processors, have been developed which render possible correction of errors, insertions of new test passages, combinations of texts derived from different sources, and reproduction and electronic storage of the data representing the portions of the text. Such automatic text processing units possess the advantage over conventional typewriters in the high degree of flexibility and time saving in the production of written documents, and accordingly a higher efficiency, associated therewith.

The ease with which information can be fed into such automatic text processing units is a significant factor in determining the outlay for storing and/or transferring information already existing on paper into the automatic text processing unit. A manual transfer of such large amounts of text would be very time consuming and an automatic transfer is therefore preferable.

In undertaking an automatic transfer of such data, the means used to transfer the data must have the capability of separating those areas of the master consisting of text or graphics from those areas containing images. In order to achieve an optimum coding of the data representing these portions of the master, as well as a separate manipulation of such portions, it is a problem in the art to provide a method and apparatus for automatically separating and classifying such components of a master.

SUMMARY OF THE INVENTION

It is an object of the present invention to provide a method and apparatus for undertaking a scanning of a master which recognize and classify image areas of the master and text or graphics areas of the master.

The above object is inventively achieved in a method and apparatus which undertake an optoelectronic scanning of a printed master for generating analog signals corresponding to the material appearing on the master and digitizing these analog signals such that areas of the master representing a "white level" are allocated a first binary number, preferably "1", and those areas of the master representing a "black level" are allocated a second binary number, preferably "0". These binary numbers are stored and the data field consisting of the stored values relating to the master which has been scanned is schematically divided into a plurality of "windows" within the memory. The edge lengths of the windows are fixed so as to not fall below the spacing between two lines of text. Four different length of run histograms are generated for each "window" by means of a computer for the purpose of determining the statistical parameters associated with those portions of the scanned master. The characteristics of the length of run histograms can be examined to determine whether the particular "window" associated therewith represents a text or graphics area of the master or an image area of the master.

Because the method described above can be realized by employing a semiconductor memory and a microcomputer, the cost and space outlay for the apparatus necessary to practice the method are relatively small and accordingly permit an economical realization of the method.

DESCRIPTION OF THE PREFERRED EMBODIMENTS

Figure 1:
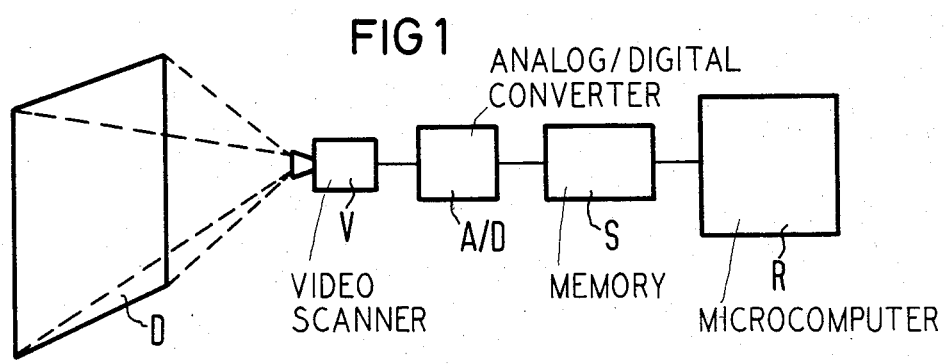
FIG. 1 is a block diagram of an apparatus for automatically recognizing image areas or text or graphics areas on a printed master constructed in accordance with the principles of the present invention.

FIG. 1 schematically shows a block diagram of an apparatus for implementing the inventive method disclosed and claimed herein. The preferred embodiment shown in FIG. 1 includes a video scanner V which optoelectronically scans a master D having printed material thereon arranged in text or graphics portions or areas of the master D and image areas or portions of the master D. The video scanner V generates analog signals in a manner well known to those skilled in the relevant technology corresponding to the scanned material on the master D. The analog signals are supplied to an analog to digital converter A/D for assignment of appropriate binary values to the analog signals representing the scanned information. The signal outputs of the analog to digital converter A/D are connected to the signal inputs of a memory S, which is preferably a semiconductor memory. A computer R, which is preferably a microcomputer, has access to the memory S. The computer R processes the data stored in the memory S as described in greater detail below for determining the parameters of the scanned printed master D which enable a recognition and classification of the image areas and the text or graphics areas to be undertaken. In order to divide the information obtained from scanning the master D into a number of discrete areas which can be individually examined, the data field, which is stored in a multitude of memory cells in the memory S, is overlaid with a grid of "windows" covering the data field, the grid being such that the "windows" partially overlap. Statistical parameters are determined for each of the "windows" and are employed for making a decision in a further step of the method disclosed and claimed herein. In order to insure that the "windows" are not of a size such that no meaningful information is contained therein, the edge length of the "windows" is selected to be greater than the spacing between two successive lines of text on the master D. This is a preselected value made on the basis of the average spacing between lines of text generated by conventional printing devices. The concept of imposing a grid which effectively divides a data field into a plurality of "windows" is described in greater detail in the co-pending application Ser. No. 300,500 filed on Sept. 9, 1981 (Bernhardt and Kochert), now. U.S. Pat. No. 4,449,239, assigned to the assignee of the subject matter of the present application.

The signals generated in analog form representing the optoelectronic imaging of the master D are respectively allocated by means of a threshold decision operation either to a binary number, preferably "1" representing a "white level," or to a binary number, preferably "0" representing a "black level." The binary numbers determined in this manner are stored in the memory S. For determining the statistical parameters of the scanned printed master D, four different length of run histograms ae subsequently generated for each "window" by the computer R. The characteristics of each of the length of run histograms are subsequently examined to determine whether the associated "window" represents a text or graphics area or an image area. As is known to those skilled in the art, a length of run histogram is essentially a statistical representation of data similar to a gray scale histogram, wherein the frequency of occurrence is entered in the histogram on one axis, such as the ordinate, and the run length is entered on the other axis, such as the abscissa. Data acquired by a conventional threshold operation is then stored after scanning the master in question, and the number of pixels in a particular uninterrupted sequence of pixels of the same type is subsequently identified and employed as the run length for formation of the histogram. The numerical values acquired in this manner are treated in the same fashion as in the formulation of a gray scale histogram.

The signals received in analog form from the video scanner V can also be divided into "white levels" and "black levels" by an analog method.

If a digital method is employed to divide the analog signals into "white levels" and "black levels", the digital values are preferably obtained by means of a comparison of sampled analog values with a predetermined digital threshold value and assigning the analog signals to a particular level depending upon whether the analog signal falls above or below the digital threshold value. It is also preferable that the grid of "windows" which is overlaid on the data field is such that the "windows" slightly overlap.

The characteristics which can be derived from the length of run histograms are employed to derive evaluation values which are subjected to a classification operation for determining whether the particular scanned area of the master D is a text or an image area or a graphics area. One of these evaluation values is derived from the length of run histograms generated for the horizontal black areas $RL_{h,s}$ shown in FIG. 4 and for the vertical black areas $RL_{v,s}$ shown in FIG. 5 according to the equation:

$$S = \frac{\sum_{l=0}^{S_H} \{[RL_{h,s}(l) + RL_{v,s}(l)] \cdot l\}^2}{\sum_{l=S_H+1}^{l_{max}} \{[RL_{h,s}(l) + RL_{v,s}(l)] \cdot l^2\}^2}.$$

The value l is the length of the various length of run histograms.

The value $S_H$ may be selected to be any suitable value such as, for example, 10.

Figure 2:
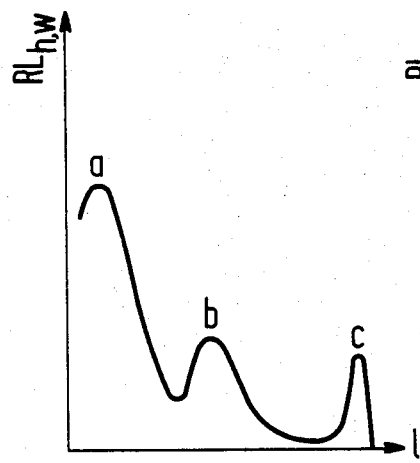
FIG. 2 shows a typical length of run histogram for text relating to horizontal white lengths of run generated in accordance with the principles of the inventive method.
Figure 3:
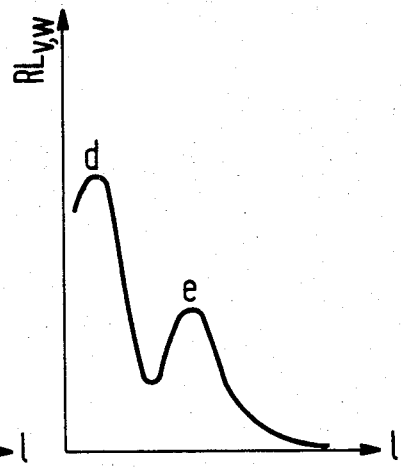
FIG. 3 shows a typical length of run histogram for text related to vertical white lengths of run generated in accordance with the principles of the present invention.

A further evaluation value is derived by means of the length of run histogram for horizontal white areas $RL_{h,w}$ shown in FIG. 2 and the length of run histogram for vertical white areas $RL_{v,w}$ shown in FIG. 3 according to the following equation:

$$RLD = \sum_{1}^{l_{max}} \left( \frac{(RL_{h,w}(l) + RL_{v,w}(l)^2)}{\sum_{1}^{l_{max}} (RL_{h,w}(l) + RL_{v,w}(l))} \right).$$

A check is then undertaken for determining whether the maximum value in the length of run histogram for horizontal white areas $RL_{h,w}$ for the longest horizontal white length of run, which corresponds to the length of the "window" in the horizontal direction, exhibits a value unequal to 0. A check is then undertaken to determine whether the area is a text area according to the following conditions:

$(S > 2.0 \cdot 10^{-2}) \wedge (RLD > 12) \wedge (RL_{h,w}(l_{max}) \neq 0)$.

When this condition is met, a text area is present.

In FIG. 2 (the length of run histogram for horizontal white areas) the areas designated at a represent the space within letters, the areas b represent the spaces between words and the areas c represent greater lengths of run in the spaces between the lines.

In FIG. 3 (the length of run histogram for vertical white areas) the areas d represent lengths of run within letters and the areas e represent the spaces between the lines.

Figure 4:
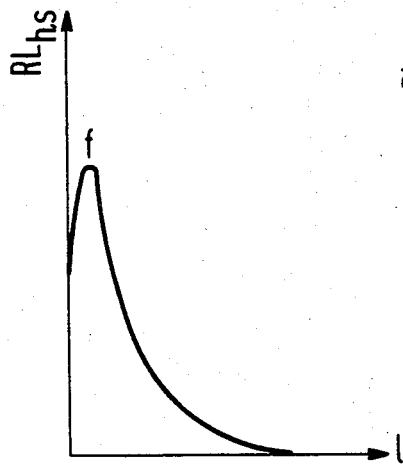
FIG. 4 shows a typical length of run histogram for text relating to horizontal black lengths of run generated in accordance with the principles of the inventive method.

In FIG. 4 (the length of run histogram for horizontal black areas) the area f represents the thicknesses of the strokes.

Figure 5:
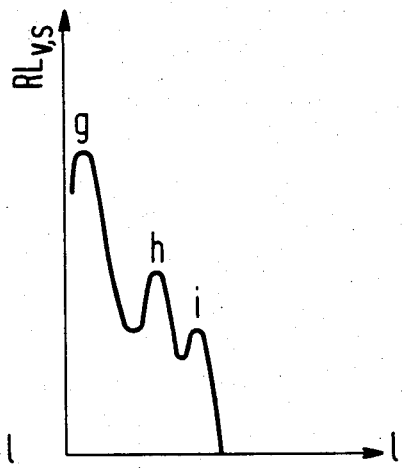
FIG. 5 shows a typical length of run histogram for text relating to vertical black lengths of run generated in accordance with the principles of the inventive method.

In FIG. 5 (the length of run histogram for vertical black areas) the areas g represent the thicknesses of the strokes, the areas h represent the size of the lower case letters and the areas i represent the size of the capital letters.

The numerical values contained in the condition for determining whether a text area is present are exemplary values only and will vary according to the value selected for $S_H$. The values stated above are appropriate values when $S_H$ is selected to be 10.

Although modifications and changes may be suggested by those skilled in the relevant technology, applicants intend to embody within the patent warrented hereon all changes and modifications as reasonably and properly come within the scope of their contribution to the art.

We claim as our invention:

1. A method for automatically recognizing and distinguishing between image areas and text or graphics areas a printed master comprising the steps of:
   optoelectronically scanning said printed master and generating analog signals representing the information contained on said printed master;
   assigning a first binary value to analog signals having a value above a preselected value and assigning a second binary value to analog signals falling below said preselected value;
   storing said binary values in a data field in a memory;
   dividing said data field into a grid consisting of a plurality of windows in said memory, said windows having edge lengths which are not less than the spacing between two lines of text on said printed master;

generating four different length of run histograms for each said window; and analyzing said length of run histograms for deriving values therefrom for determining whether the window associated therewith represents a text or graphics area or an image area of said printed master.

2. The method of claim 1 wherein said preselected value is a digital threshold value.

3. The method of claim 1 wherein said windows in said grid partially overlap.

4. The method of claim 1 wherein the step of generating four different length of run histograms for each said window is further defined by generating a length of run histogram for horizontal black areas ($RL_{h,s}$) and generating a length of run histogram for vertical black areas of said printed master ($RL_{v,s}$) and wherein the step of analyzing said length of run histograms is further defined by generating an evaluation value S according to the equation:

$$S = \frac{\sum_{l=0}^{S_H} \{[RL_{h,s}(l) + RL_{v,s}(l)] \cdot l\}^2}{\sum_{l=S_H+1}^{l_{max}} \{[RL_{h,s}(l) + RL_{v,s}(l)] \cdot l^2\}^2}$$

wherein $S_H$ is a selected value, l is the length of run for said histograms.

5. The method of claim 4 wherein said step of generating four different length of run histograms is further defined by generating a length of run histogram for horizontal white areas of said printed master ($RL_{h,w}$) and generating a length of run histogram for vertical white areas of said printed master ($RL_{v,w}$) and wherein said step of analyzing said length of run histograms is further defined by generating an evaluation value RLD according to the following equation:

$$RLD = \sum_{1}^{l_{max}} \left\{ \frac{(RL_{h,w}(l) + RL_{v,w}(l)^2)}{\sum_{1}^{l_{max}} (RL_{h,w}(l) + RL_{v,w}(l))} \right\}.$$

6. The method of claim 5 wherein the step of analyzing said length of run histograms is further defined by checking whether the value in the length of run histogram for horizontal white areas for the longest horizontal white length of run ($l_{max}$) is unequal to 0.

7. The method of claim 6 wherein $S_H$ is equal to 10 and wherein said step of analyzing said length of run histograms is further defined by determining whether the condition:

$$(S > 2.0 \cdot 10^{-2}) \wedge (RLD > 12) \wedge (RL_{h,w}(l_{max}) \neq 0)$$

exists, whereby a text area of said printed master is present if said condition is satisfied.

8. An apparatus for automatically recognizing text or graphics areas and image areas on a printed master comprising:

a means for optoelectronically scanning said printed master for generating analog signals corresponding to the information carried thereon;

a means for converting said analog signals into binary signals;

a memory for storing said binary signals in a data field, said memory having a grid having a plurality of windows therein superimposed on said data field;

a means for generating four different length of run histograms from the binary signals contained in each said window in said memory; and a means for analyzing said length of run histograms and generating evaluation values associated therewith, said evaluation values determining whether a text or graphics area or an image area is present in the window associated with said length of run histograms.

* * * * *